Figure 9:
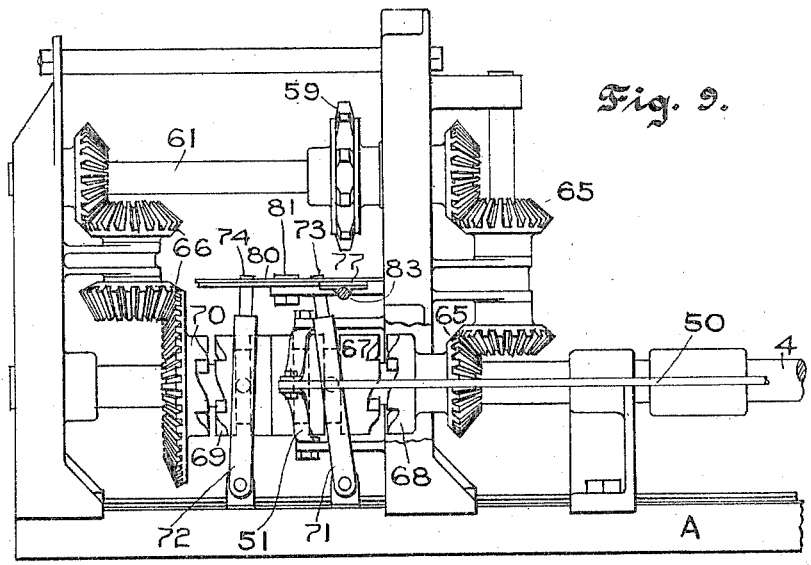

No. 821,542. PATENTED MAY 22, 1906.
A. G. A. SCHMIDT & L. CHAMPEAU.
AUTOMATIC GRAIN SHOCKING MACHINE.
APPLICATION FILED JAN. 9, 1905.
7 SHEETS—SHEET 1.
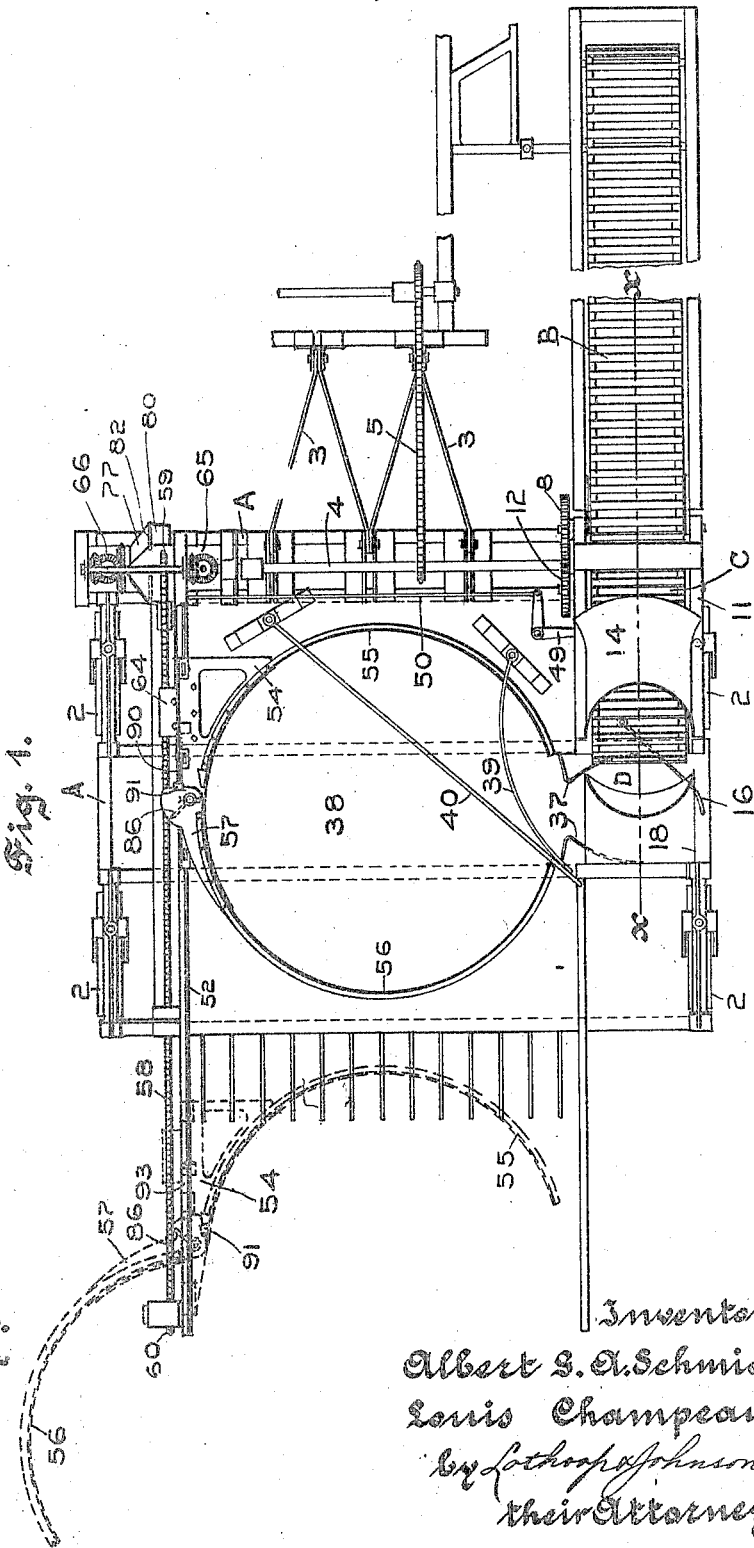

No. 821,542. PATENTED MAY 22, 1906.
A. G. A. SCHMIDT & L. CHAMPEAU.
AUTOMATIC GRAIN SHOCKING MACHINE.
APPLICATION FILED JAN. 9, 1905.
7 SHEETS—SHEET 2.
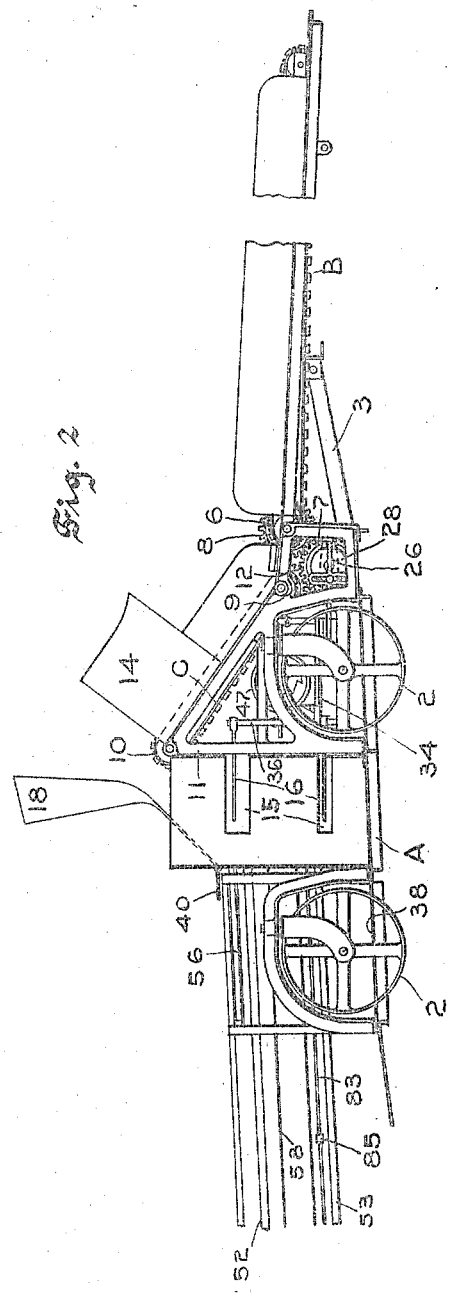
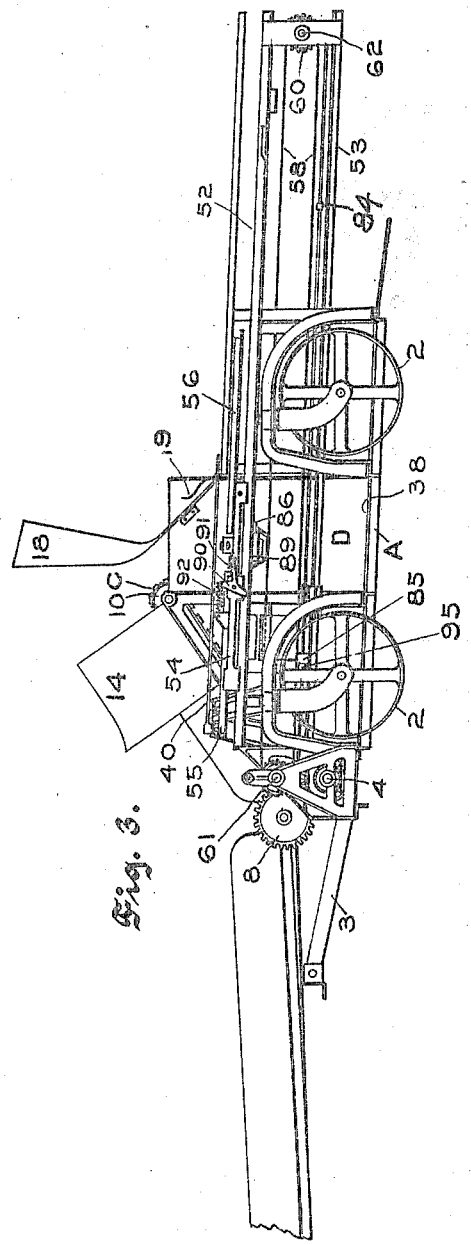
Witnesses,
W. H. Palmer
Emily F. Otis
Inventors,
Albert G. A. Schmidt,
Louis Champeau.
By Lothrop & Johnson
their Attorneys.

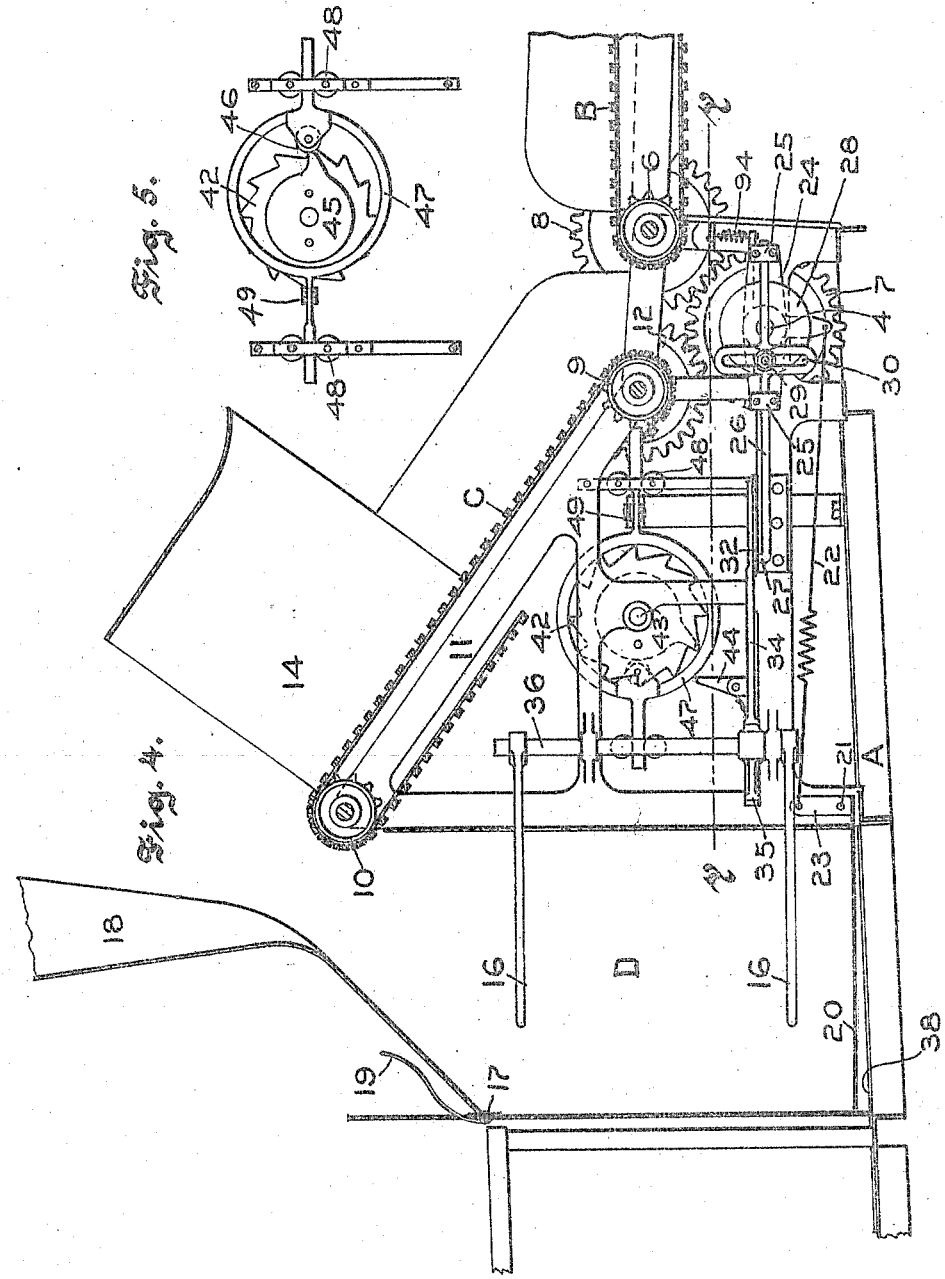

No. 821,542. PATENTED MAY 22, 1906.
A. G. A. SCHMIDT & L. CHAMPEAU.
AUTOMATIC GRAIN SHOCKING MACHINE.
APPLICATION FILED JAN. 9, 1905.
7 SHEETS—SHEET 4.
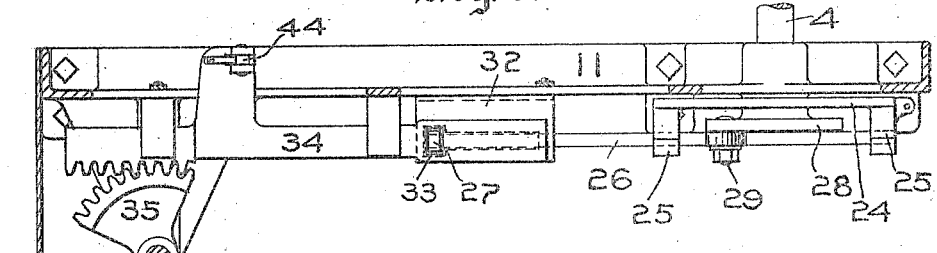
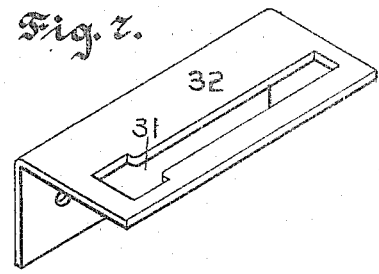
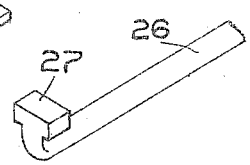
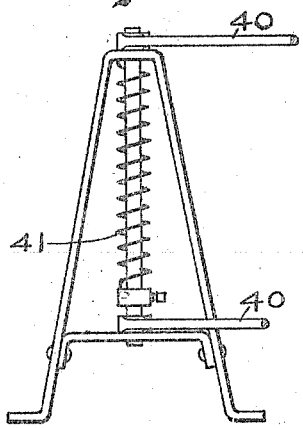
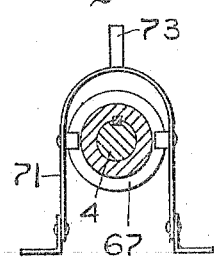
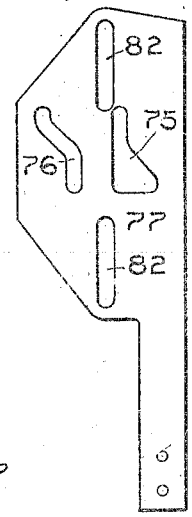
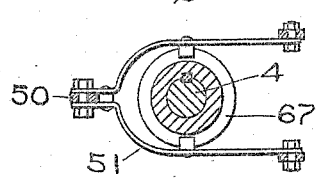
Witnesses,
W. H. Palmer.
Emily F. Otis
Inventors,
Albert G. A. Schmidt,
Louis Champeau.
by Othrop Johnin
their Attorneys.

No. 821,542. PATENTED MAY 22, 1906.
A. G. A. SCHMIDT & L. CHAMPEAU.
AUTOMATIC GRAIN SHOCKING MACHINE.
APPLICATION FILED JAN. 9, 1905.

7 SHEETS—SHEET 5.

Witnesses,
W. H. Palmer.
Emily F. Otis.

Inventors,
Albert G. A. Schmidt,
Louis Champeau.
by Lothrop Johnson
their Attorneys.

No. 821,542. PATENTED MAY 22, 1906.
A. G. A. SCHMIDT & L. CHAMPEAU.
AUTOMATIC GRAIN SHOCKING MACHINE.
APPLICATION FILED JAN. 9, 1905.
7 SHEETS—SHEET 6.
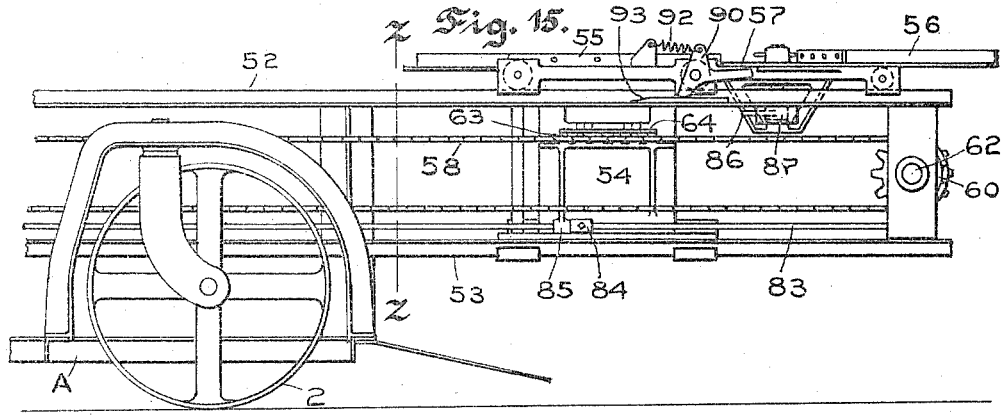
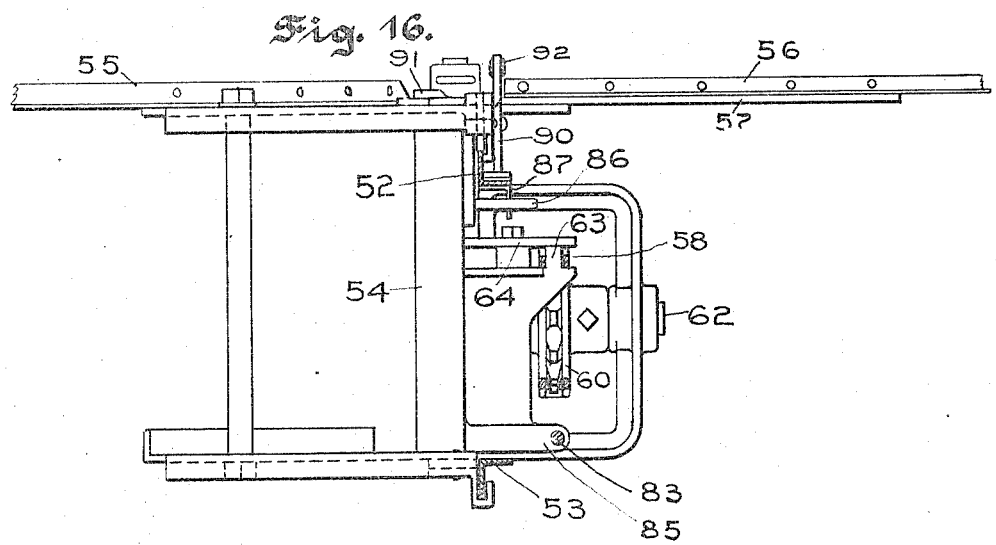
Witnesses.
W. H. Palmer.
Emily F. Otis.
Inventors,
Albert G. A. Schmidt,
Louis Champeau.
By Lothrop Johnson
their Attorneys.

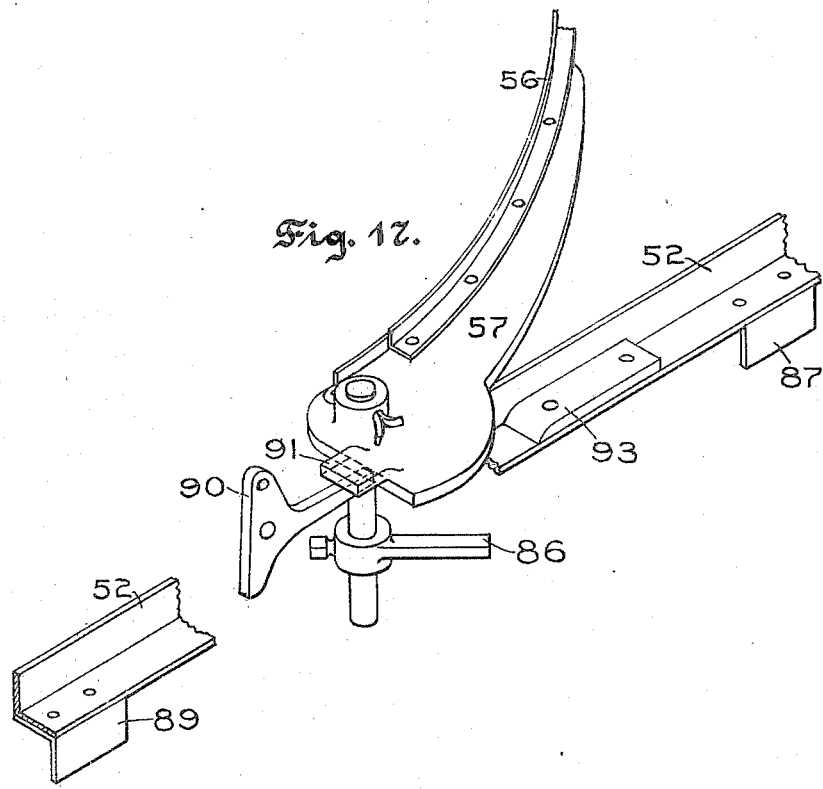

UNITED STATES PATENT OFFICE.

ALBERT G. A. SCHMIDT AND LOUIS CHAMPEAU, OF ST. PAUL, MINNESOTA.

AUTOMATIC GRAIN-SHOCKING MACHINE.

No. 821,542.

Specification of Letters Patent.

Patented May 22, 1906.

Application filed January 9, 1905. Serial No. 240,182.

*To all whom it may concern:*

Be it known that we, ALBERT G. A. SCHMIDT and LOUIS CHAMPEAU, citizens of the United States, residing at St. Paul, in the county of Ramsey and State of Minnesota, have invented certain new and useful Improvements in Automatic Grain-Shocking Machines, of which the following is a specification.

Our invention relates to improvements in automatic grain-shocking machines, and has for its object to provide a traction-machine for receiving the bundles of grain from the harvester or binder, for automatically gathering the bundles into a shock with their butt-ends down, and for discharging the shock from the moving machine in such manner that the shock shall be deposited upon the ground in upright position.

To that end we have devised a machine adapted to be attached to the binder-frame in the rear of the main wheel of the binder and arranged to receive its power therefrom and wherein the bundles of grain are received from the binder turned so that their butt-ends shall be downward and collected upon a shock-deck until a predetermined number have been assembled, when by suitable mechanism the shock is discharged rearward at the same rate of speed that the machine is traveling forward. By this device the inertia of motion of the shock due to the forward travel of the shocking-machine is neutralized by an equal inertia of motion in the opposite direction due to the rearward travel of the shock-discharging arms.

More particularly our invention consists in the features of construction, combination, and arrangement of parts hereinafter described and claimed.

Figure 10:
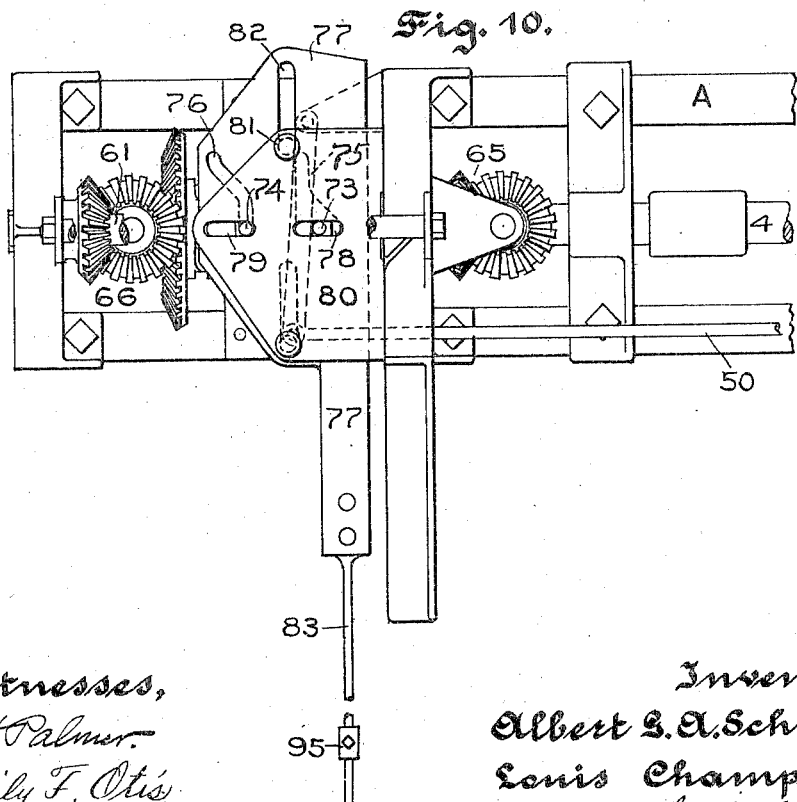

In the accompanying drawings, forming part of this specification, Figure 1 represents a plan view of our improved grain-shocking machine. Fig. 2 is a side elevation looking toward the conveyer. Fig. 3 is a side elevation looking toward the sliding frame for the shock-holding arms. Fig. 4 is a section on line *x x* of Fig. 1. Fig. 5 is a detail of part of the actuating mechanism. Fig. 6 is a section on line *y y* of Fig. 4. Figs. 7 and 8 are details of two of the parts shown in Fig. 6. Fig. 9 is an elevation of actuating clutches and gearing for the shock-discharging mechanism. Fig. 10 is a plan view of the same with some of the parts broken away. Figs. 11, 12, and 13 are details of parts of the clutch mechanism shown in Figs. 9 and 10. Fig. 14 is a detail of a supporting-standard for a pair of the shock-holding arms. Fig. 15 is a partial side elevation looking toward the sliding frame for the shock-holding arms and showing said frame in discharging position. Fig. 16 is a section on line *z z* of Fig. 15, and Fig. 17 is an isometric view of the opening and closing mechanism for the shock-encircling arm.

In the drawings, A represents the frame of the machine supported upon wheels 2 and provided with draw-bars 3 for attachment to the rear of the harvester and binder. (Not shown.) Journaled in the frame at its forward end is a transverse main shaft 4, driven from the binder by means of sprocket-wheels and chain 5.

B is an endless conveyer leading from the binder and passing over the roller or sprocket-wheel 6, driven from the main shaft 4 through the medium of intermeshing gears 7 and 8, mounted upon the main shaft and roller-shaft, respectively.

C is an inclined conveyer leading upwardly and rearwardly from the conveyer B and passing over rollers or sprocket-wheels 9 and 10, journaled in brackets 11 upon the sides of the machine. These rollers are driven from the main shaft through the medium of intermeshing gears 7 and 12 upon the main shaft and the shaft of the roller 9, respectively. Bridged across the brackets 11 and extending over the inclined conveyer at its upper end is an inverted-U-shaped tubular guide or funnel 14, through which the bundles are carried to keep them in alinement, so that they will drop squarely upon their butt-ends when turned to a vertical position, as hereinafter described.

At the rear of the conveyer C is a pocket D, formed in its outer side wall with horizontal slots 15 to allow play to the ejector-arms 16. Having hinge-support 17 upon the upper end of the rear wall of the pocket D is an inwardly-extending deflector-plate 18, having its forward end upwardly and rearwardly curved. The movement of the deflector-plate upon its hinge-support is restrained by a spring 19.

The bundles of grain as they are discharged from the binder lie upon their sides and are carried in this position heads first by the conveyers B and C through the funnel 14, which keeps them in alinement until their heads strike the upper end of the hinged deflector-plate 18, which throws the heads upwardly to a vertical position. The bundles will thus drop to the bottom of the pocket D with their butt-ends down.

At the bottom of the pocket is a tilting plate 20, pivotally supported in the frame near its forward end upon pivots 21 and held normally in upturned position by a spring-rod 22, connecting the upturned inner end 23 of the tilting plate with the downwardly-extending arm of a lever 24, said lever having pivotal support on the shaft 4. Slidable in bearings 25, carried by the lever-arm 24, is a rod 26, having an upturned lug 27 at its rear end. The rod is reciprocated by means of a disk 28, carried by the end of the shaft 4 and carrying a pin 29, extending through the vertical slot 30 of the rod 26. The lug 27, carried by the rear end of the rod 26, is adapted to pass through a slot 31 in the plate 32 and to fit into a recess or hole 33 in the rack-bar 34, arranged to reciprocate in guides. The rack-bar engages a toothed segment 35, secured to the upright rocking shaft 36, journaled in suitable bearings upon the inner sides of the brackets 11. Secured to the rocking shaft 36 are the ejector-arms 16, extending normally across the adjacent outer corner of the pocket D and through the slots 15 therein.

The operation of this part of the mechanism is as follows: When the bundle drops upon the plate 20, the plate is forced downward upon its pivotal support, turning the lever-arm 24 through the medium of the rod 22, and thereby throwing upwardly the rear end of the rod 26 to carry its lug 27 into the recess in the rack-bar. The rod 26 upon then being drawn forwardly by means of the disk 28 will operate the rack-bar to turn the segment 35 and with it the rock-shaft 36 and the ejector-arms carried thereby. The ejector-arms are thus swung inwardly against the bundle now standing upright in the pocket D to carry it butt-end down out of the pocket between restraining-springs 37 onto the shock-deck 38, the bundle being retained in upright position upon the shock-deck by the pivotally-mounted compressor-arms 39 and 40. The arms 39 and 40 are held against the bundles upon the shock-deck by means of springs 41. As soon as the bundle has left the tilting plate 20 the arm 26 will drop by action of the spring 94 out of engagement with the rack-bar, throwing up the tilting plate in position to receive another bundle. The plate 32 prevents the arm 26 dropping out of recess in the rack before it reaches original position—i. e. enlarged end of slot 31.

In order to regulate positively and uniformly the number of bundles to constitute each shock, a ratchet-wheel 42 has pivotal support 43 in the framework above the rack-bar, and the rack-bar is provided with an upwardly-extending spring-pressed pawl 44 in position to engage the teeth of the ratchet-wheel. Each time the rack-bar is moved forwardly to carry a bundle onto the shock-deck the pawl engages one of the ratchet-teeth and turns the ratchet-wheel by one tooth. The ratchet is formed with as many teeth as there are to be bundles in the shock, and every time the ratchet-wheel has completed one revolution a shock is discharged by mechanism about to be described. Carried by the ratchet-wheel 42 is a cam 45, adapted once during each revolution of the ratchet-wheel to engage with the roller 46, carried by the ring 47, having slidable support upon rollers 48 to carry said ring rearwardly. The forward side of said ring is pivotally connected by a crank 49 with a rod 50, extending transversely of the machine and connected at its opposite end with the ring 51 of the clutch mechanism, (shown in Figs. 9 and 10,) said clutch mechanism being arranged in connection with the main shaft 4.

Runningly supported in guideways 52 and 53 upon the frame of the machine at the same side of the machine as the clutch mechanism is a traveling frame 54, carrying two oppositely-curved inwardly-extending arms, a fixedly-mounted discharging-arm 55, and a retaining-arm 56, carried by a plate 57, having pivotal support upon the frame, the two arms extending around over the shock-deck to form nearly a circle, the free ends being far enough apart, however, to permit the bundles to be carried between them from the pocket D to the shock-deck. The traveling frame 54 is arranged to be reciprocated forward and back by means of a chain 58, passing over sprocket-wheels 59 and 60, mounted upon transverse shafts 61 and 62 at the front and rear ends, respectively, of the framework of the machine. Intermeshing with the chain intermediate of said sprockets are upwardly-extending teeth 63, carried by the traveling frame, the teeth being covered by a plate 64 to prevent jumping of the chain from the teeth. The chain is operated alternately in opposite directions from the main shaft 4 through the medium of the groups of intermeshing gears 65 and 66, arranged upon opposite sides of the sprocket-wheel 59. The gearing 65 is thrown into operative connection with the main shaft 4 by means of the clutch members 67 and 68, the clutch member 67 being slidable upon the shaft and the clutch member 68 being loose upon the shaft and connected with the gearing 65. The clutch member 67 is actuated by the rod 50, hereinbefore described, which is pivotally connected with the ring 51 of the clutch member. Interposed between the opposite set of gearing 66 and the shaft 4 are similar clutch members 69 and 70. Suitably connected with the slidable clutch members 67 and 69 are the pivotally-supported yokes 71 and 72. The upper ends of said yokes carry pins 73 and 74, extending through longitudinally-arranged slots 75 and 76 in a plate 77 and through transverse slots 78 and 79 in a superimposed plate 80, the plate 80 being supported by the framework. The plate 77 is slidably supported by the plate 80 by means of pins 81, carried by the plate 80 and extending through longitudinally-arranged slots 82 in the plate 77. The plate 77 carries a rod 83, extending rearwardly parallel with the traveling frame. A stop 84, carried by the rod 83, is adapted to be engaged by a block 85, carried by the traveling frame, to pull the rod and plate 77 rearwardly at a predetermined point to disengage the clutch members 67 and 68 and to throw the clutch members 69 and 70 into engagement. By referring to Fig. 10 it will be seen that the slots 75 and 76 are so shaped that the rearward moving of the slidable plate 77 will carry the pins 73 and 74 outwardly in the grooves 78 and 79 to release the clutch members 67 and 68 and throw into engagement the clutch members 69 and 70. The groups of gears 65 and 66 are of such relative size, as shown, as to operate the sprocket-wheel 59 much faster in retracting the traveling frame than in forcing it rearward to discharge a shock, thereby securing a quick return movement.

The vertical supporting-pivot of the plate 57 is provided at its lower end with a lug 86 in position to engage a trip 87 near the end of the guideway 52.

When the traveling frame and connected shock-encircling arms 55 and 56 are moved rearward a sufficient distance to permit the shock to be dropped onto the ground, the lug 86, engaging the trip 87, will cause the retaining-arm 56 to be swung out to one side, so that it will clear the shock in its return movement. The arm is returned to shock-retaining position when the traveling frame is withdrawn by means of a trip 89, which engages the lug 86. When the traveling frame is withdrawn to normal position, the block 85 engages a stop 95 upon the rod 83 to return the clutch mechanism to the position shown in Fig. 9.

In order normally to hold the arm 56 in retaining position, we provide a dog 90, pivotally supported upon the side of the traveling frame, adapted to be held against the butt-end of the plate 57 and under the lug 91, carried by the plate by means of a spring 92. When the traveling frame reaches the rear end of the runway, the dog 90 is turned out of engagement with the plate 57 by means of a trip 93, carried by the framework, thus allowing the retaining-arm to be turned into the dotted-line position in Fig. 1 in the manner hereinbefore set forth.

In order that the bundles comprised in the shock may remain in upright position after being discharged from the shock-deck, the actuating mechanism for reciprocating the traveling frame and shock-discharging arm is so arranged and geared that the speed of rearward travel of the arm shall be approximately the same as the speed of forward travel of the machine itself. There will thus be no tendency of the shock to tip over as it strikes the ground.

Having now described our invention, what we claim as new, and desire to secure by Letters Patent, is—

1. In a machine of the class described, the combination with an upwardly-inclined conveyer for the grain-bundles, of a deflector arranged above and at the rear of the conveyer for turning the bundles into upright position with their butt-ends down, a plate arranged below the discharge end of the conveyer in position to receive the bundles as they drop therefrom, a shock-deck arranged at the side of the plate, and means controlled by the bundles as they drop for carrying them onto the shock-deck.

2. In a machine of the class described, the combination with means for receiving bundles of grain from a binder, of an upwardly-inclined conveyer, a U-shaped guide bridged across the conveyer in position to permit the conveyer and the bundles carried by it to pass therethrough, and a deflector arranged at the discharge end of the conveyer for turning the bundles into upright position with their butts downward, for the purpose described.

3. A machine of the class described comprising an upwardly-inclined conveyer adapted to receive bundles of grain to be shocked, a funnel arranged above the conveyer in position for the bundles to be carried therethrough, and a deflector-plate arranged at the rear of the discharge end of the conveyer to deflect the bundles to a vertical position with their butt-ends downward, for the purpose described.

4. A machine of the class described comprising an upwardly-inclined conveyer, a deflector arranged at the rear of the conveyer for turning the bundles into upright position butt-ends down, a tilting plate arranged below the discharge end of the conveyer, a shock-deck arranged at the side of the tilting plate, means operatively connected with the tilting plate for carrying bundles therefrom onto the shock-deck, and means for discharging the bundles from the shock-deck.

5. In a traction shocking-machine of the class described, the combination with a shock-deck and means for assembling thereon bundles of grain with their butt-ends down, of a pair of shock-encircling arms slidably supported above the shock-deck, one of said arms being fixedly mounted, and the other arm being pivotally mounted, so as to swing in a horizontal plane, suitable mechanism for moving said shock-encircling arms rearward at approximately the same rate of speed as the machine is being drawn forward, and mechanism for swinging said pivoted arm to one side as the shock is being deposited.

6. In a machine of the class described, the combination with an upwardly-inclined conveyer for the grain-bundles, of means arranged above and at the rear of the conveyer for turning the bundles into upright position with their butt-ends down, a receiving-plate arranged below the discharge end of the conveyer in position to receive the bundles as they drop therefrom, a shock-deck arranged at the side of the plate, means actuated by the bundles as they drop for carrying them onto the shock-deck, and means for discharging the bundles from the shock-deck whenever a predetermned number of bundles have been assembled thereon.

7. In a machine of the class described, the combination with a shock-deck and means for assembing thereon bundles of grain with their butt-ends down, of a traveling frame supported upon the one side of the machine, a pair of shock-encircling arms carried by said frame and extending over the shock-deck, one of said arms being fixedly mounted, and the other being pivotally mounted upon said frame so as to swing in a horizontal plane, means for reciprocating said frame, means for swinging said pivoted arm to one side when the frame is carried to discharging position, and means for returning said arm to normal position when the traveling frame is returned to normal position.

8. In a traction shocking-machine of the class described, the combination with a shock-deck and means for assembling thereon bundles of grain with their butt-ends down, of a traveling frame slidably supported upon one side of the machine, a pair of shock-encircling arms supported by said frame above the shock-deck, one of said arms being fixedly mounted and the other being pivotally mounted, a main driving-shaft, clutch mechanism interposed between said shaft and frame whereby, when a predetermined number of bundles have been deposited upon said shock-deck, said frame will be carried to discharging position, means for swinging said pivoted arm to one side as the shock is deposited, and means for actuating said clutch mechanism to cause said traveling frame to be returned to normal position.

9. In a traction shocking-machine of the class described, the combination with a shock-deck and means for assembling thereon bundles of grain with their butt-ends down, of a traveling frame slidably supported upon one side of the machine, a pair of shock-encircling arms carried by said frame and extending over said shock-deck, one of said arms being fixedly mounted, and the other arm being pivotally mounted, so as to swing in a horizontal plane, a main shaft, an operative connection between said shaft and traveling frame for carrying said frame to discharging position and for returning the same to normal position, means for normally locking said pivoted arm in shock-encircling position, and means for releasing said arm and for swinging the same to one side when the frame is carried to discharging position.

In testimony whereof we affix our signatures in presence of two witnesses.

ALBERT G. A. SCHMIDT.
LOUIS CHAMPEAU.

Witnesses:
H. S. JOHNSON,
EMILY F. OTIS.